(12) United States Patent
Schreter

(10) Patent No.: US 9,910,715 B2
(45) Date of Patent: Mar. 6, 2018

(54) SYNCHRONIZATION SAFEGUARDS FOR DETECTING RACE CONDITIONS IN MULTITHREADED PROGRAMS

(71) Applicant: Ivan Schreter, Malsch (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 331 days.

(21) Appl. No.: 14/690,819

(22) Filed: Apr. 20, 2015

(65) Prior Publication Data

US 2016/0306681 A1 Oct. 20, 2016

(51) Int. Cl.
*G06F 3/00* (2006.01)
*G06F 9/52* (2006.01)

(52) U.S. Cl.
CPC ..................................... *G06F 9/52* (2013.01)

(58) Field of Classification Search
None
See application file for complete search history.

(56) References Cited

U.S. PATENT DOCUMENTS

| 7,694,312 B2* | 4/2010 | Rivard | G06F 9/4411 710/305 |
| 2008/0201393 A1* | 8/2008 | Krauss | G06F 9/52 |
| 2009/0319996 A1* | 12/2009 | Shafi | G06F 8/314 717/125 |

* cited by examiner

*Primary Examiner* — Kenneth Tang
(74) *Attorney, Agent, or Firm* — Mintz Levin Cohn Ferris Glovsky and Popeo, P.C.

(57) ABSTRACT

Each of a plurality of accesses by a multithreaded program to shared data structures stored within a database is monitored. The accesses are implemented by varying application programming interface (API) methods. Thereafter, it is determined, based on pre-defined synchronization safeguards, whether each of the accesses is valid or invalid based on the utilized corresponding API method. Those accesses to the shared data structures that were determined to be valid are allowed to proceed while those accesses to the shared data structures that were determined to be invalid are prevented from proceeding.

22 Claims, 3 Drawing Sheets

SYNCHRONIZATION SAFEGUARDS FOR DETECTING RACE CONDITIONS IN MULTITHREADED PROGRAMS

TECHNICAL FIELD

The subject matter described herein relates the detection of valid and invalid accesses to shared data structures by threads of a multithreaded program.

BACKGROUND

Debugging software programs can be particularly difficult for multithreaded programs. For example, accesses to shared resources, such as memory locations, are not often properly shielded from code bugs. In particular, threads can attempt to concurrently access the same shared resources which result in invalid internal states which can, in turn, result in program crashes and/or invalid results.

SUMMARY

In one aspect, each of a plurality of accesses by a multithreaded program to shared data structures stored within a database is monitored. The accesses are implemented by varying application programming interface (API) methods. Thereafter, it is determined, based on pre-defined synchronization safeguards, whether each of the accesses is valid or invalid based on the utilized corresponding API method. Those accesses to the shared data structures that were determined to be valid are allowed to proceed while those accesses to the shared data structures that were determined to be invalid are prevented from proceeding.

Data characterizing those accesses to the shared data structures that were determined to be invalid can be provided. Provided, in this regard, can include one or more of displaying the data, loading the data into memory, storing the data, and transmitting the data to a remote computing system. In addition or in the alternative, providing the data can include generating a report identifying the accesses to the shared data structures that were determined to be invalid and the corresponding APIs.

The shared data structures can be memory locations. The shared data structures can be used in a process, which is and/or includes an in-memory database and the shared data structures comprise parts of that database stored in main memory of the system.

The pre-defined synchronization safeguards can include, for each API, an associated access contract that specifies what types of accesses are valid and what types of access are invalid. The determining can include checking the associated access contract for the corresponding API.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The current subject matter provides many technical advantages. For example, the current subject matter provides techniques for guarding access to shared structures (such as locations within main memory of an in-memory database) which, in turn, prevents invalid accesses from proceeding. Still further, the current subject matter can be used to provide detailed reports which can, in turn, be used for debugging purposes. Further, the synchronization safeguard methods can be used for early detection of race conditions during development process which, in turn, can greatly simplify the debugging analysis so that development costs can be greatly reduced.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter includes a number of aspects that can be applied individually or in combination with various types of multithreaded programs across different types of database/computing platforms. For example, the current subject matter can be implemented in database systems using in-memory OLAP, for example including databases sized at several terabytes (or more), tables with billions (or more) of rows, and the like; systems using in-memory OLTP (e.g. enterprise resource planning or ERP system or the like, for example in databases sized at several terabytes (or more) with high transactional volumes; and systems using on-disk OLAP (e.g. "big data," analytics servers for advanced analytics, data warehousing, business intelligence environments, or the like), for example databases sized at several petabytes or even more, tables with up to trillions of rows, and the like.

Figure 1:
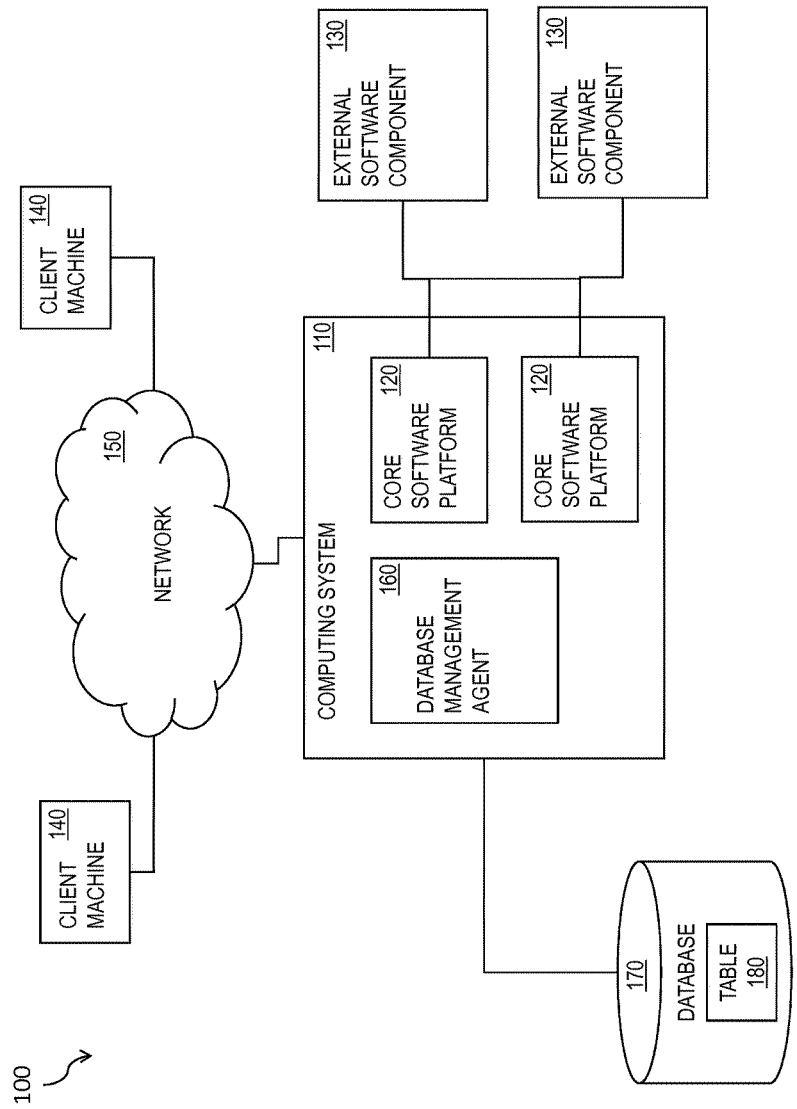
FIG. 1 is a diagram illustrating features of a business software system architecture.

The current subject matter can be implemented as a core software platform of an enterprise resource planning (ERP) system, other business software architecture, or other data-intensive computing application or software architecture that runs on one or more processors that are under the control of a specific organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 1 shows a diagram 100 of a system consistent with such an implementation. A computing system 110 can include one or more core software platform modules 120 providing one or more features of the business software system. The computing system can also aggregate or otherwise provide a gateway via which users can access functionality provided by one or more external software components 130. Client machines 140 can access the computing system, either via a direct connection, a local terminal, or over a network 150 (e.g. a local area network, a wide area network, a wireless network, the Internet, or the like).

A database management agent 160 or other comparable functionality can access a database management system 170 that stores and provides access to data (e.g. definitions of business scenarios, business processes, and one or more business configurations as well as data, metadata, master data, etc. relating to definitions of the business scenarios, business processes, and one or more business configurations, and/or concrete instances of data objects and/or business objects that are relevant to a specific instance of a business scenario or a business process, and the like. The database management system 170 can include at least one table 180 and additionally include parallelization features consistent with those described herein.

Figure 2:
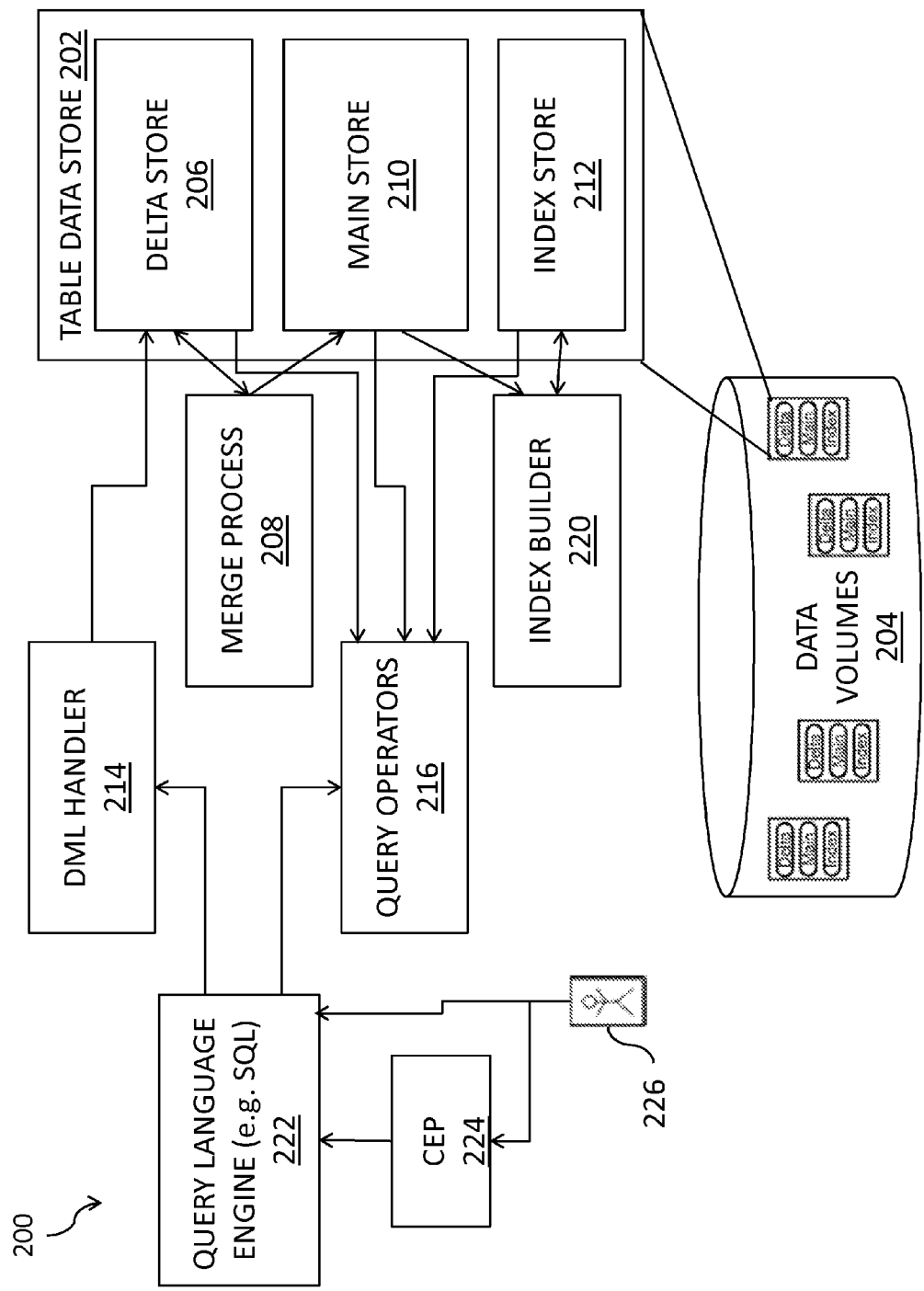
FIG. 2 is another diagram illustrating features of a business software system architecture.

FIG. 2 shows a block diagram of an architecture 200 illustrating features that can be included in a database or database management system consistent with implementations of the current subject matter. A table data store 202, which can be retained among a plurality of data volumes 204, can include one or more of a delta store 206 (e.g. a paged delta part, which can optionally be OLTP optimized and can optionally include a merge process 208), an index store 212 (e.g. one or more segmented indices), and a main store 210. The main store 210 can include a main part that is fragmented consistent with features described herein.

The computing system 110 and/or the core software platforms 120 and/or the external software components 130 can execute multithreaded programs. Such multithreaded programs can have threads that concurrently access data structures such as those within the table data store 202. In order to prevent any race/conflict conditions, access to shared structures can be guarded by detecting invalid usage and, in some cases, reporting the conflicting accesses. With some variations, only actual application programming interface (API) functions modifying the shared state needs to be instrumented appropriately to check the contract of the API (as will be described in further detail).

In one illustration, a vector class from a standard library can have several methods which read data (e.g., front( ), back( ), size( ), etc.) and several methods which modify data (e.g., push_back( )). Respective API methods can be instrumented to indicate whether the data (forming part of the shared structure) is only read or also modified. Based on such an arrangement, the synchronization safeguard subsystem can catch invalid accesses. An example of an invalid access is one thread trying to read the last element of the vector, while another thread attempts to push back a new element.

Shared data structures, such as main memory of an in-memory database, can have associated shared states. With the current subject matter, each shared state can be extended by a synchronization safeguard item (one machine word), which is initialized at the time of state initialization to a certain value (e.g., one example is 0xbabeface0ffffffULL). Each read access can be instrumented by adding a shared safeguard scope, each write access by adding an exclusive safeguard scope (scope constructor acquires the guard, destructor releases).

Acquire and release can, for example, use atomic instructions and checks as follows.

exclusive acquire: atomically increments the current value by exclusive flag (e.g., 0x0000000010000000ULL) and then checks, whether the resulting value is correct (e.g., 0xbabeface1ffffffULL).

exclusive release: atomically compares and swaps exclusive value (e.g., 0xbabeface1ffffffULL) to initial value (e.g., 0xbabeface0ffffffULL).

shared acquire: atomically decrements the current value by one and checks, whether the new value is less than initial value.

shared release: if the current value is less than initial value, atomically compare and swap it to current value+1. Repeat until either compare and swap succeeds, or the current value is higher than initial value (error state).

In case the operation fails, the error can, for example, cause the program to abort both threads involved with the conflict. A report can be generated or other data provided that identifies, for example, the thread, shared data structure, and/or the associated APIs for debugging purposes.

The following demonstrates how an initial value can be either exclusive or a shared state transition. In a first, example, if the data structure is already accessed in shared scope, and another access in parallel wants to access the data structure in exclusive scope, a subsequent exclusive acquire will fail because the new value after atomic increment is incorrect (off by n, n=# of shared acquires). In addition, a shared release attempt by the first accessor will fail because the current value is higher than initial value (incremented by exclusive acquire).

In another scenario, a current thread already has an exclusive scope on the shared data structure. A subsequent shared acquire will fail because the new value is higher than initial value (exclusive scope already added huge increment). Further, an exclusive release will fail because the current value is not equal to exclusive value (decremented by shared acquire).

In yet another scenario, the data structure is already used by a parallel thread in shared scope. No error occurs when another thread tries to acquire shared scope, because new shared access to the shared data structure just decrements the value, which is still less than initial value.

Exclusive increment can be chosen such that they are large enough to prevent possible overflow problems (i.e., much higher than potential number of threads accessing the state in shared mode).

Further, destruction of the shared state can overwrite the synchronization safeguard item with some special pattern (such as 0xdeadbeefdeadbeefULL). This can be used in addition to normal checks to easily detect that an object has been destroyed by checking top-level bits of synchronization guard item in acquire/release calls and report errors accordingly.

Figure 3:
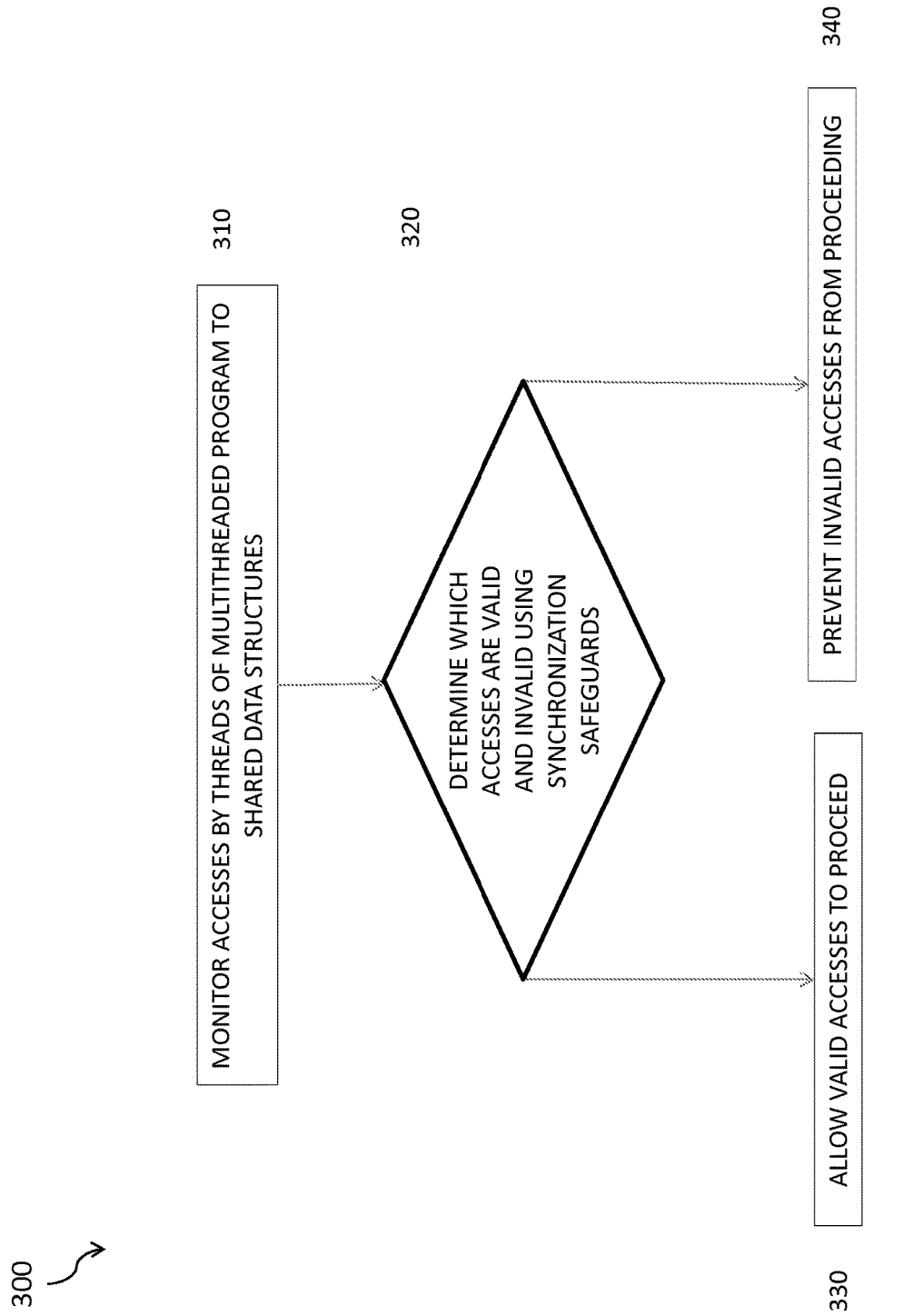
FIG. 3 is a process flow diagram illustrating the use of synchronization safeguards in avoiding race conditions during the execution of multithreaded programs.

FIG. 3 is a process flow diagram 300 in which, at 310, each of a plurality of accesses by a multithreaded program to shared data structures within a database can be monitored. The accesses can be implemented via varying application programming interface (API) methods. Thereafter, at 320, it can be determined, based on pre-defined synchronization safeguards, whether each of the accesses are valid or invalid based on the utilized corresponding API method. Accesses to the shared data structures that were determined to be valid are allowed, at 330, to proceed while accesses to the shared data structures that were not determined to be valid are, 340, prevented and/or logged for reporting/debugging purposes.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claim.

What is claimed is:

1. A method comprising:
   monitoring each of a plurality of accesses by a multi-threaded program to shared data structures stored within a database, the accesses being implemented by varying application programming interface (API) methods;
   determining, based on pre-defined synchronization safeguards, whether each of the accesses is valid or invalid based on the utilized corresponding API method, wherein the pre-defined synchronization safeguards comprise, for each API, an associated access contract that specifies what types of accesses are valid and what types of access are invalid, wherein the synchronization safe guards are included in a shared state associated with the shared data structures, wherein the determining comprises checking the associated access contract for the corresponding API;
   allowing those accesses to the shared data structures that were determined to be valid to proceed; and
   preventing those accesses to the shared data structures that were determined to be invalid from proceeding.

2. The method of claim 1 further comprising:
   providing data characterizing those accesses to the shared data structures that were determined to be invalid.

3. The method of claim 2, wherein the providing data comprises at least one of: displaying the data, loading the data into memory, storing the data, and transmitting the data to a remote computing system.

4. The method of claim 2, wherein the providing data comprises generating a report identifying the accesses to the shared data structures that were determined to be invalid and the corresponding APIs.

5. The method of claim 1, wherein the shared data structures comprise memory locations.

6. The method of claim 5, wherein the database comprises an in-memory database and the shared data structures comprise main memory for the in-memory database.

7. The method of claim 1, wherein the shared contract includes a shared safeguard scope and an exclusive safeguard scope.

8. The method of claim 7, wherein the accesses being implemented by the API methods include an exclusive acquire, an exclusive release, a shared acquire, and a shared release;
wherein the exclusive acquire atomically increments a current value by an exclusive flag;
wherein the exclusive release atomically compares and swaps the exclusive value to an initial value;
wherein the shared acquire atomically decrements the current value; and
wherein the shared release atomically increments the current value.

9. The method of claim 8, wherein the shared contract specifies:
that the current value is correct upon exclusive acquire;
that the current value is the initial value upon exclusive release; and
that the current value is less than the initial value upon shared acquire.

10. The method of claim 9, further comprising:
determining that a first access of the plurality of accesses performed by a first thread is invalid in response to determining that the current value is higher than the initial value.

11. The method of claim 9, further comprising:
determining that a first access of the plurality of accesses performed by a first thread is invalid in response to determining that the current value is not equal to an exclusive value.

12. The method of claim 9, further comprising:
determining that a first access of the plurality of accesses performed by a first thread is valid in response to determining that the current value is less than the initial value.

13. A system comprising:
a database;
at least one data processor; and
memory storing instructions which, when executed by the at least one data processor, result in operations comprising:
monitoring each of a plurality of accesses by a multi-threaded program to shared data structures stored within the database, the accesses being implemented by varying application programming interface (API) methods;
determining, based on pre-defined synchronization safeguards, whether each of the accesses is valid or invalid based on the utilized corresponding API method, wherein the pre-defined synchronization safeguards comprise, for each API, an associated access contract that specifies what types of accesses are valid and what types of access are invalid, wherein the synchronization safe guards are included in a shared state associated with the shared data structures, wherein the determining comprises checking the associated access contract for the corresponding API;
allowing those accesses to the shared data structures that were determined to be valid to proceed; and
preventing those accesses to the shared data structures that were determined to be invalid from proceeding.

14. The system of claim 13 wherein the operations further comprise:
providing data characterizing those accesses to the shared data structures that were determined to be invalid.

15. The system of claim 14, wherein the providing data comprises at least one of: displaying the data, loading the data into memory, storing the data, and transmitting the data to a remote computing system.

16. The system of claim 14, wherein the providing data comprises generating a report identifying the accesses to the shared data structures that were determined to be invalid and the corresponding APIs.

17. The system of claim 13, wherein the shared data structures comprise memory locations.

18. The system of claim 17, wherein the database comprises an in-memory database and the shared data structures comprise main memory for the in-memory database.

19. A non-transitory computer program product storing instructions which, when executed by a least one data processor forming part of at least one computing system, results in operations comprising:
monitoring each of a plurality of accesses by a multi-threaded program to shared data structures stored within a database, the accesses being implemented by varying application programming interface (API) methods;
determining, based on pre-defined synchronization safeguards, whether each of the accesses is valid or invalid based on the utilized corresponding API method, wherein the pre-defined synchronization safeguards comprise, for each API, an associated access contract that specifies what types of accesses are valid and what types of access are invalid, wherein the synchronization safe guards are included in a shared state associated with the shared data structures, wherein the determining comprises checking the associated access contract for the corresponding API;
allowing those accesses to the shared data structures that were determined to be valid to proceed; and
preventing those accesses to the shared data structures that were determined to be invalid from proceeding.

20. The computer program product of claim 19, wherein the operations further comprise: generating a report identifying the accesses to the shared data structures that were determined to be invalid and the corresponding APIs.

21. The computer program product of claim 19, wherein the shared data structures comprise memory locations.

22. The computer program product of claim 19, wherein:
the database comprises an in-memory database and the shared data structures comprise main memory for the in-memory database.

* * * * *